J. J. CAMPODONICO.
TRANSMISSION.
APPLICATION FILED SEPT. 5, 1916.

1,302,764.

Patented May 6, 1919.
7 SHEETS—SHEET 1.

WITNESSES:

INVENTOR
John J. Campodonico
BY Strong & Townsend
ATTORNEYS

J. J. CAMPODONICO.
TRANSMISSION.
APPLICATION FILED SEPT. 5, 1916.

1,302,764.

Patented May 6, 1919.
7 SHEETS—SHEET 3.

WITNESSES:
Lincoln Johnson
Charles Pickles

INVENTOR
John J. Campodonico
BY Strong & Townsend
ATTORNEYS

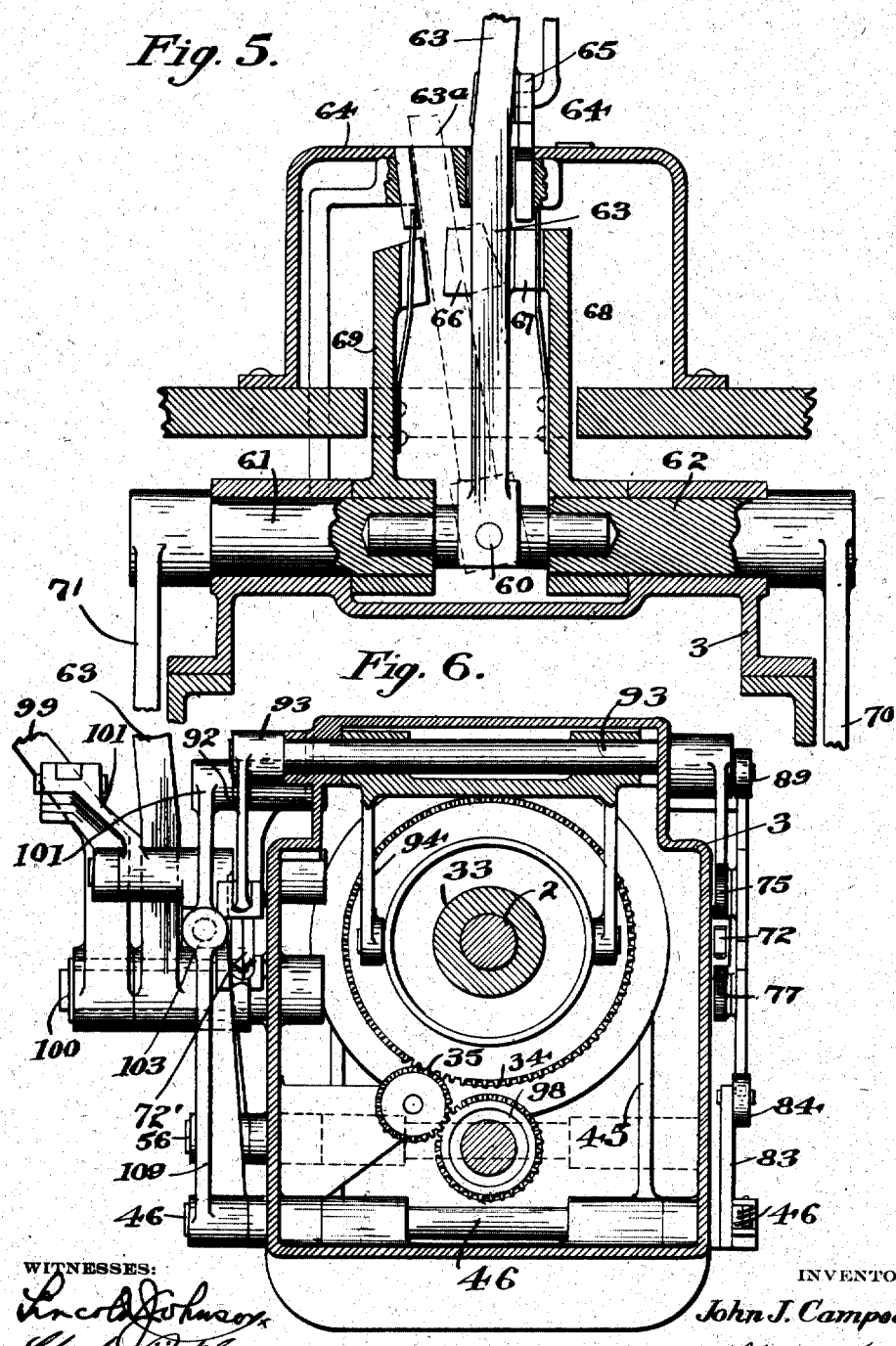

J. J. CAMPODONICO.
TRANSMISSION.
APPLICATION FILED SEPT. 5, 1916.

1,302,764.

Patented May 6, 1919.
7 SHEETS—SHEET 5.

WITNESSES:

INVENTOR
John J. Campodonico
BY Strong & Townsend
ATTORNEYS

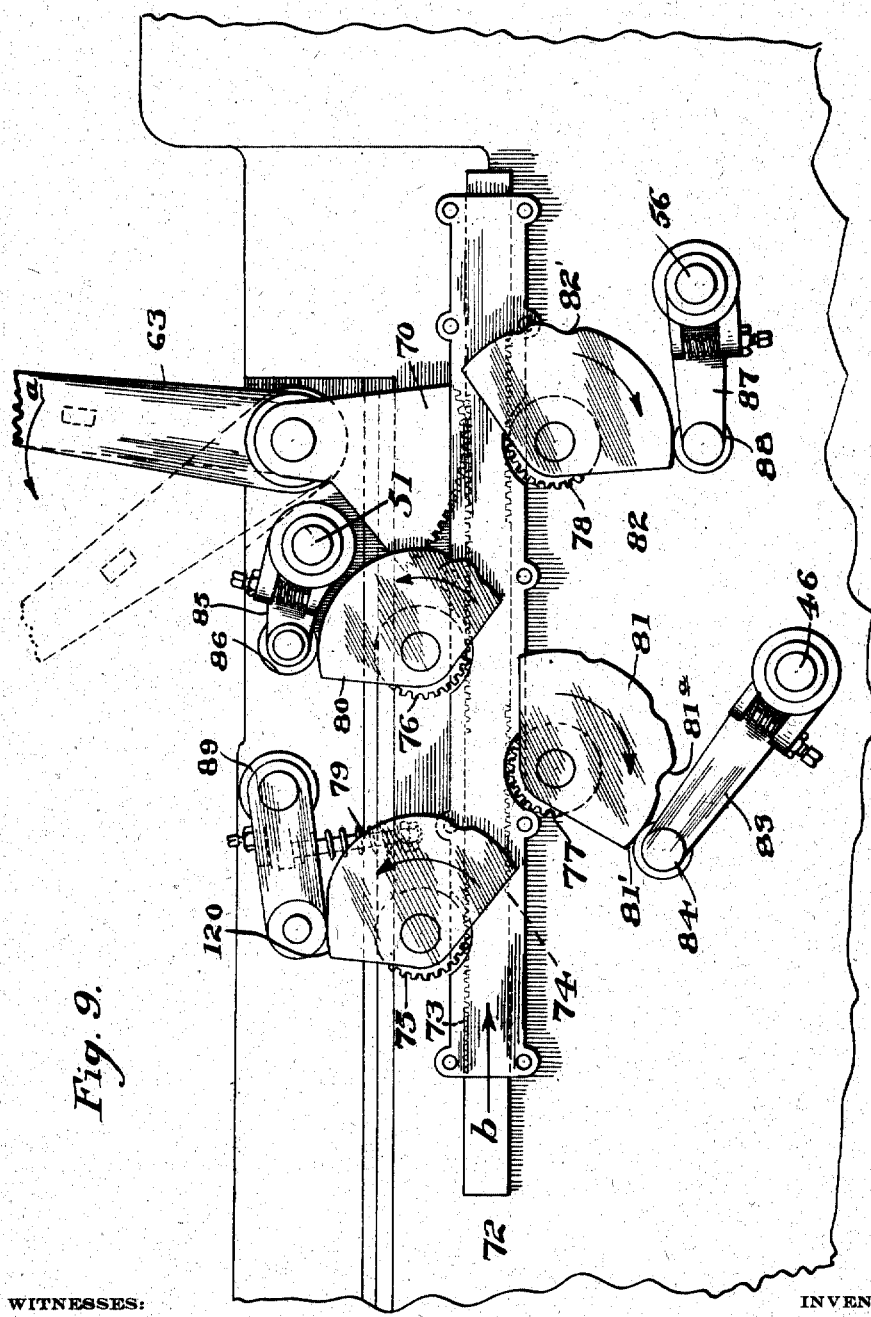

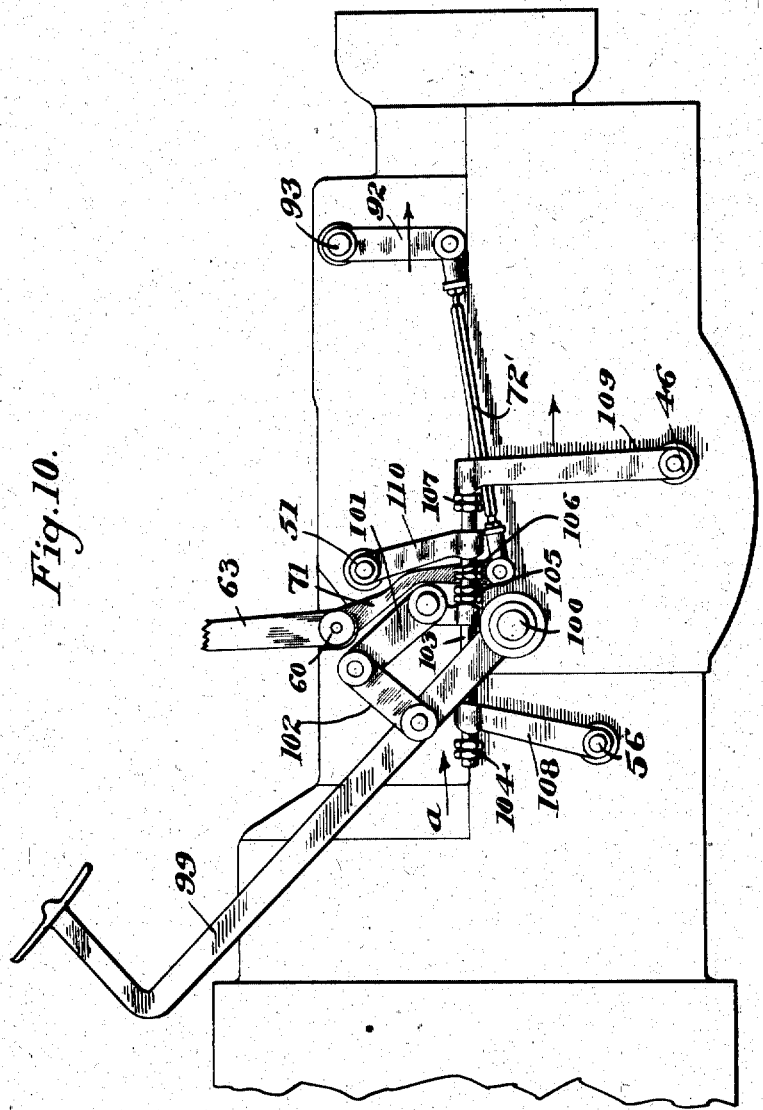

UNITED STATES PATENT OFFICE.

JOHN J. CAMPODONICO, OF STOCKTON, CALIFORNIA.

TRANSMISSION.

1,302,764.  Specification of Letters Patent.  Patented May 6, 1919.

Application filed September 5, 1916. Serial No. 118,552.

*To all whom it may concern:*

Be it known that I, JOHN J. CAMPODONICO, a citizen of the United States, residing at Stockton, in the county of San Joaquin and State of California, have invented new and useful Improvements in Transmissions, of which the following is a specification.

This invention relates to a multi-speed gear transmission and reverse, for automobiles and like power-driven vehicles.

One of the objects of the present invention is to provide a simple, substantial, easily operated selective gear transmission in which the gears are at all times maintained in mesh even when changing from a direct drive to intermediate or low, furthermore to provide a single shifting lever by which said changes are controlled, and in conjunction therewith a plurality of multi-disk clutches, one for each speed, and a plurality of cam members directly connected and operated by the lever for throwing the several clutches into or out of engagement.

Another object of the invention is to provide a gear transmission which is so constructed and arranged that a direct drive may be transmitted through a single continuous shaft mounted in alinement with the engine or driving shaft, and also to provide a structure which will permit the counter-shaft to remain at rest when a direct drive is being transmitted.

Another object of the invention is to provide means for automatically transmitting a spinning movement to the counter shaft when changing from direct to intermediate, this being of considerable importance as it relieves the connected clutch of considerable strain and shock to which it would otherwise be subjected.

Further objects will hereafter appear.

The invention consists of the parts, and the construction and combination of parts as hereinafter more fully described, and claimed, having reference to the accompanying drawings in which:

Fig. 5 is an enlarged detail end view partly in section of the shifting lever.

Fig. 6 is an enlarged cross section on line 6—6 Fig. 1.

Fig. 9 is an enlarged detail view in side elevation showing the connection between the shifting lever and the several cams operated thereby.

Fig. 10 is a side elevation of the foot pedal control.

Figure 1:
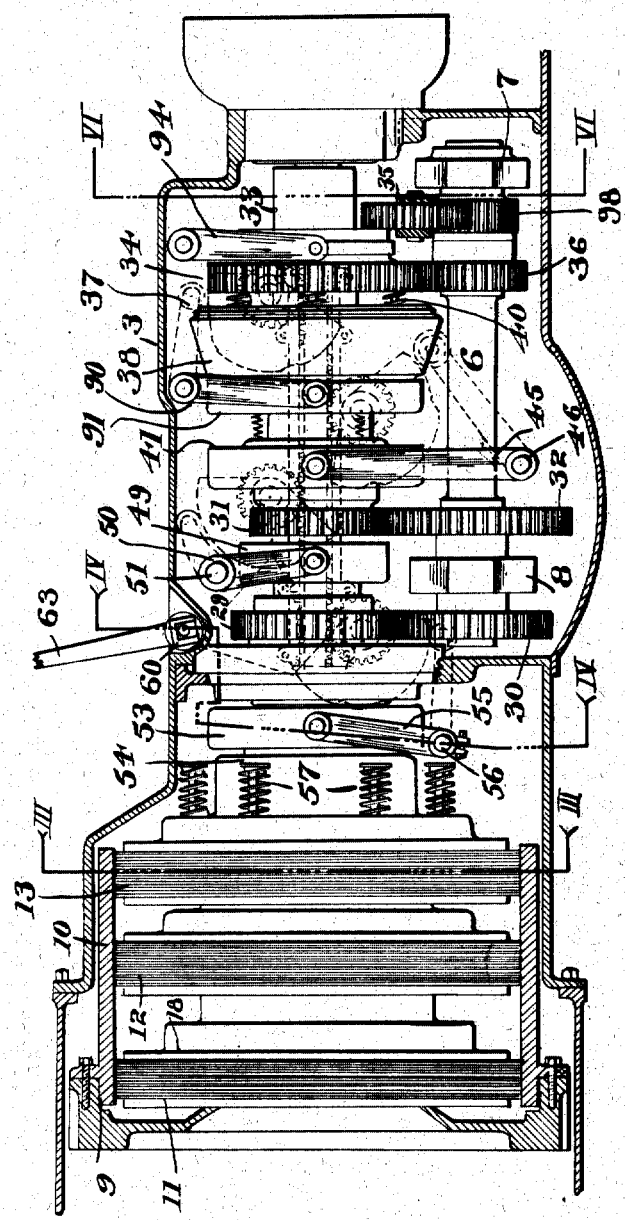
Figure 1 is a side elevation of the transmission.
Figure 2:
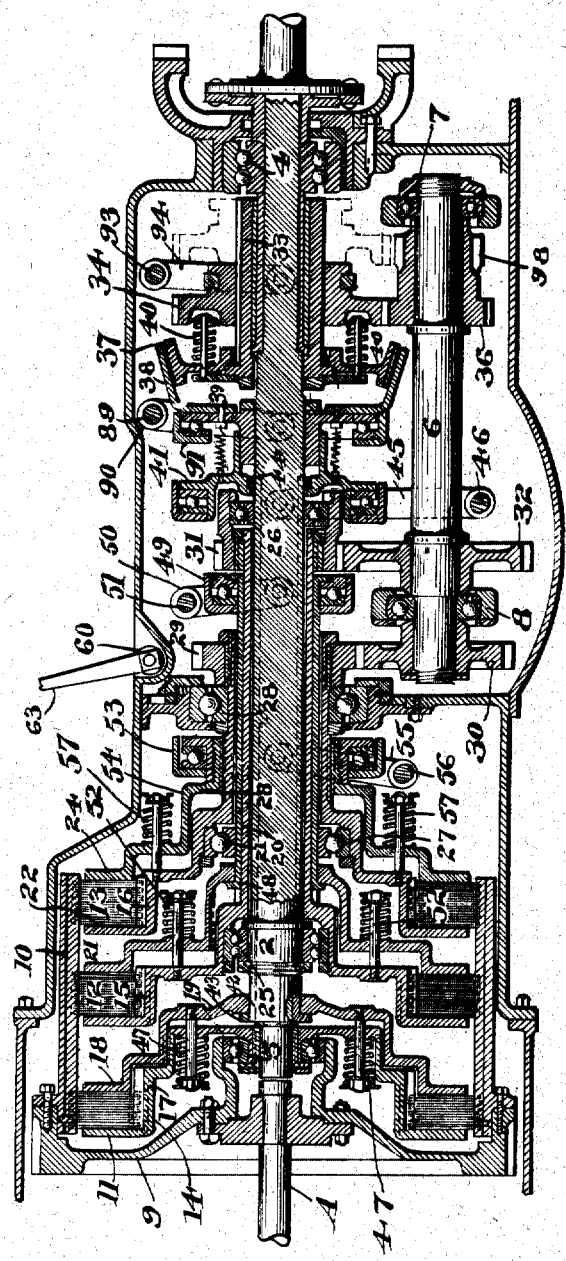
Fig. 2 is a central, vertical, longitudinal section of Fig. 1.
Figure 3:
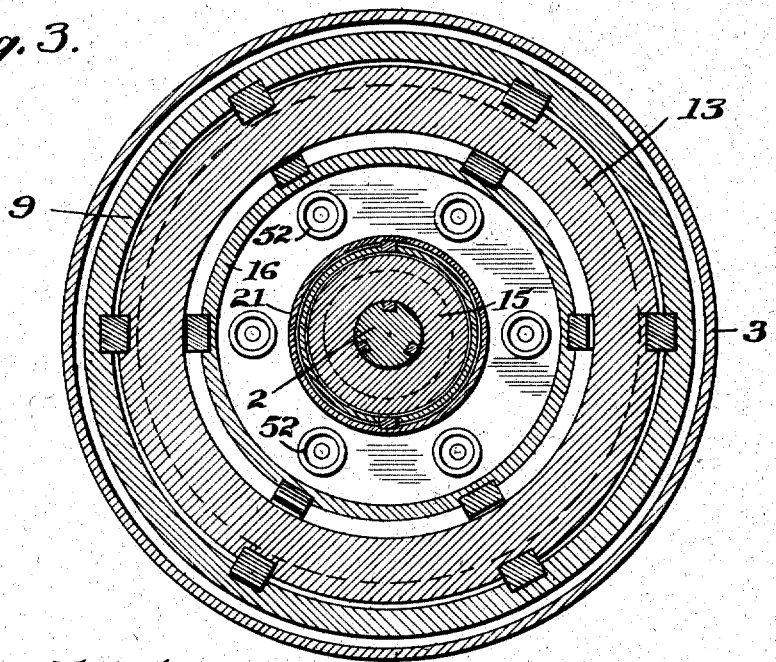
Fig. 3 is an enlarged cross section on line 3—3 Fig. 1.
Figure 4:
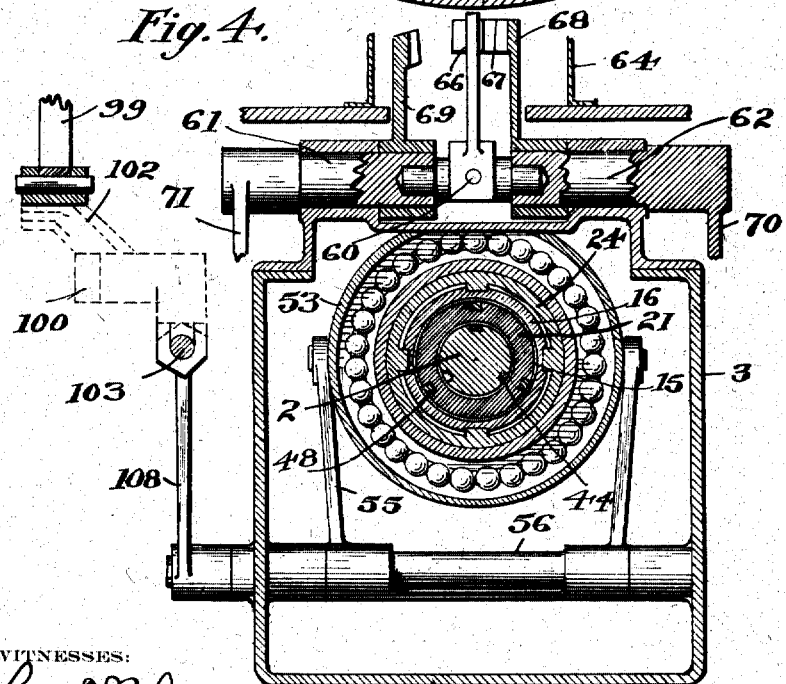
Fig. 4 is an enlarged cross section of line 4—4 Fig. 1.

Referring to the drawings in detail and particularly to Figs. 1 and 2, A indicates an engine shaft, 2 an alined transmission shaft suitably supported within a casing 3 by a pair of bearings indicated at 4 and 5, and 6 a counter-shaft also mounted within the casing, and journaled in bearings 7 and 8. 9 indicates a fly wheel keyed or otherwise secured to the engine shaft, and 10 an extended rim secured or formed integral with the fly wheel. Suitably secured and turnable with the rim 10 of the fly wheel 9 are three sets of multiple disks such as indicated at 11, 12 and 13 which are adapted to form coöperating members with the clutches indicated at 14, 15 and 16. The clutch 14 consists of a stationary member 17 keyed or otherwise secured upon the transmission shaft 2 and a coöperating sliding member 18 which is slidably mounted upon the shaft. The clutch 15 consists of a stationary member 19 keyed or otherwise secured upon a sleeve 20 turnably mounted on the shaft 2 and a coöperating member 21 which is keyed and slidably mounted on the sleeve 20. The clutch 16 similarly consists of a stationary section 22 secured or formed integral with a sleeve 23 turnably mounted exterior of the sleeve 20 and a coöperative member 24, which is keyed and slidably mounted upon the sleeve 23. The clutches 14, 15 and 16 are nothing more or less than standard multiple disk clutches and will hereafter be known as the direct clutch, the low clutch and the intermediate clutch. The transmission shaft 2 is journaled in bearings 4 and 5. The sleeve 20 with attached clutch 15 in bearings 25 and 26, and the sleeve 23 with attached clutch 16 in bearings 27 and 28. While anti-friction ball bearings have here been shown throughout, it is obvious that any form of bearing may be employed. Secured upon the sleeve 23 on the end opposite the intermediate clutch 16, is a spur gear 29 which remains in constant mesh with a spur gear 30 secured on the counter shaft 6. Similarly secured on the sleeve 20 at the end opposite the low clutch 15, is a spur gear 31 which intermeshes with a smaller gear 32 secured upon the counter shaft 6. Turnably mounted on the transmission shaft 2 on the end opposite the multi disk clutches, is a sleeve 33, on which is keyed and slidably mounted a spur gear 34, which is adapted to intermesh with either the reverse gear 35 shown, or the forward driving gear 36, which is secured on the countershaft 6. Secured on the inner end of the sleeve 33 is a cone 37 which forms a coöperating member of the clutch 38, which is keyed and slidably mounted on the transmission shaft 2. Formed on the inner faces of the clutch sections 37 and 38 are coöperating jaw members 39, which are adapted to be thrown into mesh to form a direct driving connection between the same. For the purpose of permitting the interlocking of the jaws 39, movement must be permitted so far as the cone 37 is concerned. This is accomplished by mounting it on the feather or key formed on the sleeve 33, which permits it to move or slide along the sleeve 33 against the tension of springs 40 when the jaw members are being brought into mesh by sliding the clutch section 38 along the transmission shaft 2 as will hereinafter be described.

Connecting the movable section 18 of the direct clutch 14 with a shaft collar 41 is a plurality of key members 42. Each key member is slidably mounted in keyways formed in the transmission shaft 2, and one end of each member is turned up as at 43 to engage the movable section 18 of the clutch 14. The opposite end of each key member being similarly turned up as at 44 to engage the shifting collar 41. A direct connection is in this manner made between the shifting collar and the sliding member 18 of the clutch 14 to permit the disks to be moved into or out of engagement with relation to each other. The shifting collar 41 with connected clutch section 18 is moved in one direction by a rocker arm 45 secured upon the shaft 46 extending through the transmission case 3, and in the opposite direction by means of springs 47. Slidably mounted in grooves, formed in sleeve 20 is a plurality of key members 48. One end of each of said key members is turned up to engage the movable section 21 of the low clutch 15, while the opposite ends are turned up to engage a shifting collar 49. The slidable section 21 of the low clutch 15 is moved in one direction by means of a crank arm 50 which is secured upon the shaft 51 extending through the gear casing 3, and in the opposite direction by springs 52 similar to the springs 47 previously described. In connection with the movable section 24 of the intermediate clutch, it is possible to eliminate the sliding keys such as shown at 42 and 48 as the shifting collar 53 provided may be directly attached upon a hub 54 formed on the movable section 24. Movement of the shifting collar with the connected clutch section 24 is transmitted in one direction by a crank arm 55 secured upon the shaft 56 also extending through the transmission case 3, and in the opposite direction by means of spring tension produced by springs 57. For the purpose of permitting speed changes from direct to intermediate or low, or to reverse by means of a single controlling mechanism, the following has been provided:—

Pivotally mounted as at 60 upon a pin or short shaft section which is journaled between the two shafts such as shown at 61 and 62 is a shifting lever 63. This lever extends through a slot formed in the guide plate 64 and is adapted to be secured in any position along the slot by means of notches formed therein, and a coöperating pawl 65. Formed on both sides of the lever 63 below the guide plate 64 is a pair of outwardly projecting lugs 66 and 67. The lug 67 is adapted to engage with a recess formed in the upper end of a crank arm 68 secured on the shaft 62, and the lug 66 is adapted to engage with a recess formed in the upper end of the crank arm 69, secured on the shaft 61. The shafts 62 and 61 are journaled in the transmission casing 3. The shaft 62 having formed on its outer end a gear segment 70 and the shaft 61, a crank arm 71 which is connected with a link 72' and a crank arm hereinafter to be described.

Slidably mounted on one side of the transmission case is a rack member 72 having gear teeth 73 and 74 formed on its opposite edges, and intermeshing with teeth 73 is the gear 70 and a pair of pinions 75 and 76, see Fig. 9. Intermeshing with the teeth 74 formed on the lower side of the rack bar, is a pair of pinions 77 and 78, and adapted to coöperate or turn in unison with the several pinions are a plurality of cam members 79, 80, 81 and 82. The cam 79 turns in unison with the pinion 75, cam 80 with the pinion 76, cam 81 with the pinion 77, and the cam 82 with the pinion 78. Movement of the lever 63 in the direction of arrow $a$ transmits movement through the segment 70 to move the rack bar in the direction of arrow $b$, and consequently turns the respective pinions and cams in the direction of the arrows indicated; conversely movement of the lever 63 in the opposite direction reverses the movement described.

The shafts 46, 51 and 56 previously mentioned in the specification as coöperating with the shifting collars 41, 49 and 53, are journaled in and extending through both sides of the transmission case as shown in Figs. 9 and 10. Secured on the shaft 46 on one side of the casing is a crank arm 83, on the outer end of which is journaled a roller 84 which normally rests on the face of the cam and similarly secured on one end of the shaft 56 is an arm 87 on the outer end of which is journaled a roller 88, mounted to engage the face of the cam 82. Extending through both sides of the casing and journaled therein is a fourth shaft 89. This is mounted adjacent the cam 79 and is also provided with a crank arm and roller which engages and is operated by said cam. Secured on the shaft 89 interior of the transmission case, is a crank arm 90 which connects with a shifting collar 91 forming a part of the clutch member 38.

The link 72 previously described operated by a crank arm 71 is attached to the lower end of the crank arm 92, which is secured on the shaft 93 journaled and extending through the transmission case. Secured on the shaft 93 interior of the casing is a forked lever 94 which straddles and engages with the hub of gear 34. This gear is in mesh with the gear 36 on the countershaft, when a direct intermediate or low speed is being transmitted or is moved into mesh with the reversing gear 35, when it is desired to reverse. This movement of the gear 34 is accomplished by rocking the lever 63 about its pivot 60 from one side of the slot formed in the guide plate to the opposite side where it will assume the dotted line position shown at 63ª. The hub 66 will here engage the upper recessed end of the crank arm 69 and will move said crank arm and turn the shaft 61 when the lever is shoved forward in the slot formed on this side of the plate. The turning movement of the shaft 61 is in turn transmitted through the crank arm 71, link 72′, crank arm 92, and shaft 93 to the forked lever 94, which will then swing to slide the gear 34 from the full line position to the dotted line shown where it will intermesh with the reversing pinion 35; power is then transmitted through the low speed clutch 15, sleeve 20, gear 31 to gear 32, countershaft 6, gear 98, pinion 35 to gear 34, sleeve 33 and clutch 39, thus turning shaft 2 reverse to engine direction.

The operation of the present transmission is effected entirely by means of lever 63 and a foot lever 99. This foot lever is provided for the purpose of throwing out the several clutches when it is desired to change the speed or free the engine. This is accomplished as follows:—

The foot lever proper is pivotally mounted on the side of the transmission casing as at 100. Pivotally mounted on the casing just above the pivotal point 100 is a bell crank 101, one end of which is connected with the foot lever 99 by means of a link 102.

Slidably mounted on the side of the transmission casing intermediate of the bell crank and the pivotal point 100 of the foot lever, is a rod 103 upon which is mounted 4 adjustable nuts 104, 105, 106 and 107. Secured on the shaft 56 on the side opposite the crank arm 87 with connected coöperating cam 82, is an arm 108 which is adapted to be engaged by the nut 104, and similarly secured on the shafts 46 and 51 are arms 109 and 110. The arm 110 is adapted to be engaged by a nut 106, and the arm 109 by the nut 107. Similarly the lower end of the bell crank is adapted to be engaged by the nut 105.

The several cams 79, 80, 81 and 82 provided, have recesses formed in their surface which are so arranged that only one clutch can possibly be operated at one time, and the shifting lever 63 with attached gear segment 70 and coöperating rack bar 72, and pinions 75, 76, 77 and 78 are so arranged that all cams will turn in unison, but only one clutch can possibly engage.

It can therefore be seen that two clutches will always remain out while one clutch will remain engaging, unless the lever 72 is moved to one of two neutral positions hereinafter to be described.

Figure 7:
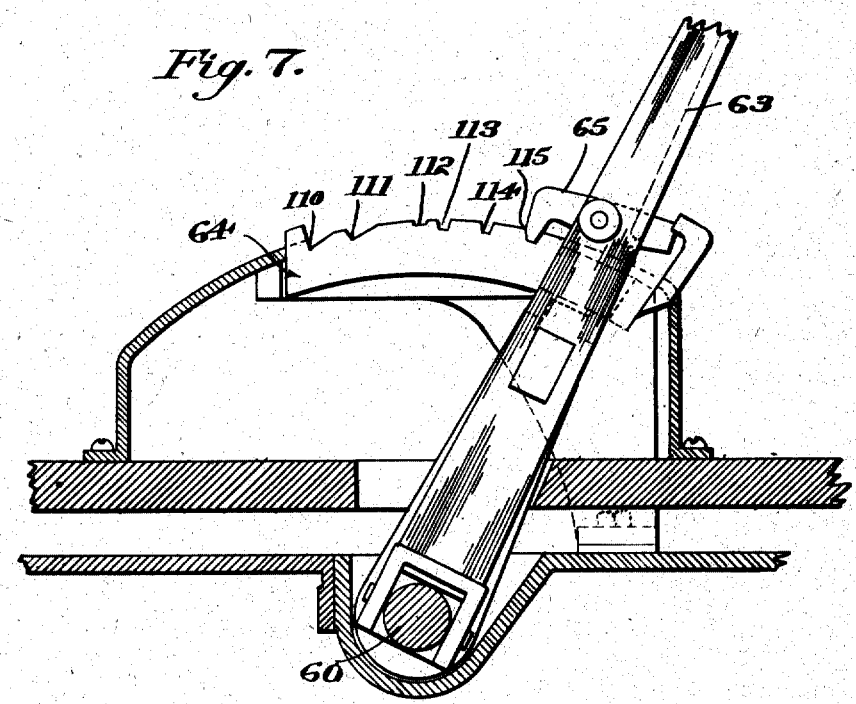
Fig. 7 is a side elevation of the lever in Fig. 5.
Figure 8:
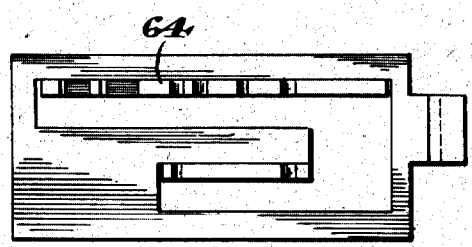
Fig. 8 is a plan view of the guide plate through which the shifting lever passes.

The foot lever 99 however provides a means whereby the remaining clutch may be disengaged to permit as free a movement of the shifting lever 63 as possible. By referring to Fig. 7 it will be seen that the slotted guide plate 64 has formed therein 6 notches, any one of which the lever 63 may engage or assume alinement with. The first notch 110 is for a direct drive, the second 111 is called a twirling notch as will hereinafter be described; third 112, neutral; fourth, 113 intermediate; fifth 114 second neutral; and the sixth 115, low. The offset in the guide plate shown in Fig. 8 being only employed when reversing.

With the engine running and the car standing, we may assume that the lever 63 stands in alinement with or engages one of the neutral notches. If the lever is in engagement with the neutral notch 114 and it is desired to start the car, it is accomplished as follows:—

The foot lever 99 is first depressed to keep out any clutches hereafter selected from engaging before desired. This is accomplished in the following manner. The depression of the foot lever transmits movement through the link 102 to rock the bell crank 101. The lower end of the bell crank when rocked, engages the nut 105 and moves the rod 103 in the direction of arrow a, (see Fig. 10). The respective nuts 104, 106 and 107 in this manner engage the levers 108, 109, 110, and thereby transmits rocking movement to said levers which in turn is transmitted through their respective shafts and connected arms which engage with the clutch shifting collars, in this manner sliding said collars and releasing the clutch spring pressure from cams 79, 80, 81, 82. The lever 63 is then moved into engagement with the low notch 115 and the foot lever 99 is released. Power is in this manner transmitted through the engine shaft and the fly wheel, through the low clutch and the connected sleeve 20 to the gear 31 which intermeshes with the gear 32 on the transmission shaft 6, and is in turn transmitted through the gear 36 and intermeshing gear 34 to the sleeve 33 which is keyed through clutch 39 to the transmission shaft which, as previously described, is directly connected with a propeller shaft in any suitable manner. If it is desired to advance to an intermediate drive, it is again necessary to depress the foot lever 99. This as previously described, transmits a sliding movement to the rod 103 in the direction of arrow $a$, and causes the nuts to engage the respective arms 108, 109 and 110 which are connected with the several clutch shifting collars. The low clutch is in this manner thrown out, the spring pressure against cams 81 and 82 relieved, and the lever moved over to engagement with the intermediate notch 113, when it is again possible to release the foot lever to permit the intermediate clutch to engage. Power is then transmitted through the intermediate clutch and the sleeve 23 to the gear 29 which intermeshes with the gear 30 secured on the counter shaft, and the power is here again transmitted through the intermeshing gears 36 and 34 to the sleeve 33 and the transmission shaft, but as the gear ratio is greater than when driving through the low clutch, it will be seen that a higher speed will be transmitted.

Movement of the lever 63 from the low notch 115, to the intermediate notch 113, also causes the segment 70 to move the rack bar 72 in the direction of arrow $b$ (see Fig. 9) and consequently transmits movement to rotate the intermeshing pinions and connected cams in the direction of the arrows shown. The intermediate cam 82 being moved until a notch 82' comes into alinement with the roller 88. The other cams of course travel exactly the same distance, but the cam surfaces are so formed that no notches will be in alinement with the coöperating rollers. The clutches operated by said cams will therefore be held out, but the clutch controlled by the cam 82 is permitted to engage the moment the foot lever is released, as the depression 82' formed in the cam 82 when in alinement with the roller 88, permits this to enter and rock the shaft 56 sufficiently to permit the intermediate clutch to engage.

If it is desired to transmit a direct drive, it is effected by again depressing the foot lever, which operation will disengage the intermediate clutch, as it is the only one which is in engagement. The lever 63 is then moved into engagement with the direct notch 110 and the foot lever is then released to permit the direct clutch to engage. Power is then transmitted from the engine shaft through the fly wheel and the direct clutch, direct to the transmission shaft 2 without passing through the intermediate shaft, and as the propeller shaft is in direct alinement with and connected with the transmission shaft, it can be seen that a direct drive is produced. The movement of the lever from the intermediate notch to the direct notch causes the rack bar 72 to travel still farther in the direction of arrow $b$ and similarly cause a further rotation of the several cams in the direction of the arrows shown. The direct cam 81 will in this manner assume the position shown in Fig. 9 where a recessed end 81' will be in alinement with the roller 84 and arm 83. The other cams of course also turn a similar distance, but as their cam faces are not provided with recesses or depressions at this point, it will be seen that the respective coöperating clutches will be held out and that only the direct clutch can engage when the foot lever is released.

As previously stated, power is transmitted directly from the engine shaft through the fly wheel and direct clutch, to the transmission shaft, and through the alined transmission shaft and propeller shaft without passing through the counter shaft or sleeves and gears surrounding the transmission shaft. The several clutches, sleeves, gears and countershaft will therefore remain at rest and unnecessary wear of said parts is entirely eliminated. If it is desired to free the engine at any time while traveling in the direct clutch, it is only necessary to depress the foot lever. If it is desired to drop back into intermediate, it is again necessary to depress the foot lever to move the lever 63 back to the intermediate notch. This movement of the lever 63 back into intermediate position, reverses the direction of travel of the rack bar, and similarly the turning movement of the cams. The depression in the intermediate cam is thus moved back into alinement with the coöperating roller 88 and arm 87 to permit the connected clutch to engage when the foot lever is released, similarly the other cams are turned to a point where the coöperating clutches are positively held from engagement when the foot lever is released.

For the purpose of transmitting twirling or turning movement to the countershaft 6, when moving from direct to intermediate or to low, and to obviate any shock to the revolving parts when either the intermediate or low clutch is engaged, the double acting cone and jaw clutch 37 and 39 have been provided. Movement of the cam 81 from the position shown on Fig. 9 through reversing the lever 63, is accompanied by movement of the other cams, first to permit the cam 82 to move its depression into alinement with the roller 88 and movement of the other cams to positively lock the others against engagement. Movement of the cam 79 therefore also takes place while the cam 81 is moving from one end of the depression to the first point of the high surface indicated at 81ª. This movement of cam 79 rocks the coöperating lever and shaft 89 which, as before described, is provided for the purpose of operating the section 38 of the cone clutch 37. The section 38 of said clutch is in this manner moved into frictional engagement with the cone 37 before the direct clutch has been fully disengaged and the frictional engagement with the parts 37 and 38 increased, cause the sleeve 33, with attached gear 34, to revolve and turn the countershaft 6, thus transmitting a twirling or accelerating movement to said shaft, before either the intermediate or low clutch can possibly be engaged. The revolving movement thus transmitted to the counter-shaft causes the gears to run in unison and when finally one or the other of the clutches are engaged, the connection will be so gradual that no perceptible shock will be felt. As previously stated, the first turning movement of the cams in unison when moving from direct to intermediate or low speed, causes the cam 79 to rock the shaft 89, thus moving the clutch 38 into engagement with the cone 37 to transmit the twirling movement described. A further movement of the cam 79 however rocks the shaft 89 still farther, and this movement is transmitted to section 38 of the cone clutch thus bringing the jaws 39 into mesh, thereby forming a direct driving connection between the transmission shaft and the sleeve 33 with attached gear 34 through which power is transmitted from the countershaft.

A positive engagement of the teeth in the jaw clutch 39 is maintained during the whole turning movement of the cam 79 and the only time it is possible to disengage is when the lever 63 is moved from intermediate to direct, or during the period when the roller on shaft 89 passes over the particular cam surface of cam 79 indicated at 120.

From the foregoing description it will be seen that positive and instantaneous speed changing without the need of meshing gears is accomplished, consequently reducing chances of stripping teeth or subjecting same to undue stresses.

A direct drive is also secured between the engine and the propeller shaft through a continuous and alined transmission shaft, in this manner permitting the countershaft and the remaining mechanism to rest, except when intermediate, low, or reverse is being transmitted. The shockless changing of speeds through the equalizing effect of transmitting a twirling or accelerating speed to the countershaft is of considerable importance as it prevents the jaw clutch members from engaging before the parts are revolving at relative speeds.

Another important feature of the present invention is the provision of a transmission which is not only progressive in principle, but also selective in action, as it is possible to move from low directly into the high or the reverse as the operator may desire. The provision of the connected operating cams directly connected with the shifting lever always insures the positive operation of the clutch required.

No precaution in changing the speeds is therefore necessary, as all parts are automatically arranged to positively move to their selective positions with relation to gears and speeds to be transmitted. The provision of the cams furthermore prevents more than one clutch from engaging at a time, and furthermore provides two neutral points which will hold all the clutches out, irrespective of the action of the foot lever. Similarly if when driving on one speed it is desired to free the engine, it is not necessary to move the shifting lever 63 as any clutch may be released by merely depressing the foot lever.

The materials and finish of the several parts may be such as the experience and judgment of the manufacturer may dictate.

I wish it understood that various changes in form, proportions, and minor details of construction may be resorted to within the scope of the appended claims, and that I do not wish to limit myself to the specific design or construction here shown.

Having thus described my invention, what I claim and desire to secure by Letters Patent is:—

1. In a transmission mechanism, a driving shaft, a driven shaft, a clutch adapted to connect the driving shaft with the driven shaft, manually controlled means for throwing said clutch into and out of engagement, and a foot operated mechanism for throwing the clutch into and out of engagement independent of said first named means.

2. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, manually controlled means for throwing in any one of the three clutches and simultaneously and automatically holding the other clutches out of engagement.

3. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, manually controlled means for throwing in any one of the three clutches and simultaneously and automatically holding the other clutches out of engagement, and a second manually controlled means for throwing out any engaging clutch independent of said first named means.

4. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, a manually controlled mechanism for maintaining all the clutches out of engagement, and also adapted to select any clutch and throw it into engagement.

5. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, a manually controlled mechanism for maintaining all the clutches out of engagement and also adapted to select any clutch and throw it into engagement, and means for automatically preventing more than one clutch from being thrown into engagement.

6. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, a manually controlled mechanism for maintaining all the clutches out of engagement, and also adapted to select any clutch and throw it into engagement, and a second manually controlled means for throwing out any engaging clutch independent of said first named means.

7. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, a manually controlled mechanism for maintaining all the clutches out of engagement and also adapted to select any clutch and throw it into engagement, means for automatically preventing more than one clutch from being thrown into engagement, and a second manually controlled means for throwing out any engaging clutch independent of said first named means.

8. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shaft, a gear secured on each sleeve shaft, a counter shaft, a pair of gears secured on said shaft constantly intermeshing with the gears on the sleeve shafts, a gear turnably mounted on the driven shaft, a combination jaw and friction clutch secured on said shaft adapted to lock said gear against turning movement on said shaft, a third gear secured on the counter shaft with which the turnably mounted gear is adapted to intermesh, and means for selecting and throwing any one of the first named clutches into or out of engagement.

9. In a transmission mechanism, a driving shaft, a driven shaft, a pair of sleeve shafts journaled one exterior of the other on the driven shaft, a clutch secured on each sleeve shaft and on the driven shaft adapted to connect any one of said shafts with the driving shafts, a gear secured on each sleeve shaft, a counter shaft, a pair of gears secured on said shaft constantly intermeshing with the gears on the sleeve shafts, a gear turnably mounted on the driven shaft, a combination jaw and friction clutch secured on said shaft adapted to lock said gear against turning movement on said shaft, a third gear secured on the counter shaft with which the turnably mounted gear is adapted to intermesh, means for selecting and throwing any one of the first named clutches into or out of engagement, and means coöperating with two of said clutches for automatically throwing the combination jaw and friction clutch into engagement in advance of either of said clutches when they are thrown into engagement.

10. In a transmission mechanism, a driving shaft, a driven shaft, a counter shaft, a low speed transmission sleeve shaft journaled exterior of the driven shaft, an intermediate speed transmission sleeve shaft journaled exterior of the low speed sleeve shaft, a gear secured on each of said sleeve shafts constantly intermeshing with gears secured on the counter shaft, a direct clutch secured on the driven shaft, a low clutch secured on the low speed sleeve shaft, an intermediate clutch secured on the intermediate speed sleeve shaft, said clutches adapted to connect any one of said shafts with the driving shaft, means for manually selecting and throwing in any one of said clutches, and means for automatically maintaining the other two clutches out of engagement.

11. In a transmission mechanism, a driving shaft, a driven shaft, a counter shaft, a low speed transmission sleeve shaft journaled exterior of the driven shaft, an intermediate speed transmission sleeve shaft journaled exterior of the low speed sleeve shaft, a gear secured on each of said sleeve shafts constantly intermeshing with gears secured on the counter shaft, a direct clutch secured on the driven shaft, a low clutch secured on the low speed sleeve shaft, an intermediate clutch secured on the intermediate speed sleeve shaft, said clutches adapted to connect any one of said shafts with the driving shaft, a third gear secured on the counter shaft, a reversing gear intermeshing with a fourth gear secured on the counter shaft, a gear keyed but slidably mounted in a sleeve which is turnably mounted on the driven shaft, means for sliding said gear into mesh either with the third gear or the reversing gear, means for locking said sleeve against turning movement on the driven shaft, and means for throwing in any one of said clutches.

12. In a transmission mechanism, a driving shaft, a driven shaft, a counter shaft, a low speed transmission sleeve shaft journaled exterior of the driving shaft, an intermediate speed transmission sleeve shaft journaled exterior of the low speed sleeve shaft, a gear secured on each of said sleeve shafts constantly intermeshing with gears secured on the counter shaft, a direct clutch secured on the driven shaft, a low clutch secured on the low speed sleeve shaft, an intermediate clutch secured on the intermediate speed sleeve shaft, said clutches adapted to connect any one of said shafts with the driving shaft, a third gear secured on the counter shaft, a reversing gear intermeshing with a fourth gear secured on the counter shaft, a gear keyed but slidably mounted in a sleeve which is turnably mounted on the driven shaft, means for sliding said gear into mesh either with the third gear or the reversing gear, means for locking said sleeve against turning movement on the driven shaft, means for selecting and throwing in any one of the clutches, and means for automatically preventing more than one clutch from being thrown in at one time.

13. In a transmission mechanism, a driving shaft, a driven shaft, a counter shaft, a low speed transmission sleeve shaft journaled exterior of the driving shaft, an intermediate speed transmission sleeve shaft journaled exterior of the low speed sleeve shaft, a gear secured on each of said sleeve shafts constantly intermeshing with gears secured on the counter shaft, a direct clutch secured on the driven shaft, a low clutch secured on the low speed sleeve shaft, an intermediate clutch secured on the intermediate speed sleeve shaft, said clutches adapted to connect any one of said shafts with the driving shaft, a third gear secured on the counter shaft, a reversing gear intermeshing with a fourth gear secured on the counter shaft, a gear keyed but slidably mounted in a sleeve which is turnably mounted on the driven shaft, means for sliding said gear into mesh either with the third gear or the reversing gear, means for locking said sleeve against turning movement on the driven shaft and means for selecting and throwing in any one of the clutches, and means for automatically preventing more than one clutch from being thrown in at one time, and a second means adapted to throw out any clutch which may happen to be in engagement.

14. In a transmission mechanism, a driving shaft, a driven shaft, a counter shaft, a low speed transmission sleeve shaft journaled exterior of the driven shaft, an intermediate speed transmission sleeve shaft journaled exterior to the low speed sleeve shaft, a gear secured on each of said sleeve shafts constantly intermeshing with gears secured on the countershaft, a direct clutch secured on the driven shaft, a low clutch secured on the low speed sleeve shaft, an intermediate clutch secured on the intermediate speed sleeve shaft, said clutches adapted to connect any one of said shafts with the driving shaft, a third gear secured on the counter shaft, a reversing gear intermeshing with a fourth gear secured on the counter shaft, a gear keyed but slidably mounted in a sleeve which is turnably mounted on the driven shaft, means for sliding said gear into mesh either with the third gear or the reversing gear, a combination jaw and friction clutch secured on the driven shaft adapted to lock the gear carrying sleeve against turning movement about the driven shaft, means for selecting and throwing in either the direct, the intermediate or the low speed clutch, and means coöperating with the intermediate and low speed clutch for automatically throwing in the combination jaw and friction clutch in advance of either of said clutches.

15. In a transmission mechanism, a driving shaft, a driven shaft, a counter shaft, a low speed transmission sleeve shaft journaled exterior of the driven shaft, an intermediate speed transmission sleeve shaft journaled exterior of the low speed sleeve shaft, a gear secured on each of said sleeve shafts constantly intermeshing with gears secured on the counter-shaft, a direct clutch secured on the driven shaft, a low clutch secured on the low speed sleeve shaft, an intermediate clutch secured on the intermediate speed sleeve shaft, said clutches adapted to connect any one of said shafts with the driving shaft, a third gear secured on the counter-shaft, a reversing gear intermeshing with a fourth gear secured on the countershaft, a gear keyed but slidably mounted in a sleeve which is turnably mounted on the driven shaft, means for sliding said gear into mesh either with the third gear or the reversing gear, a combination jaw and friction clutch secured on the driven shaft adapted to lock the gear carrying sleeve against turning movement about the driven shaft, means for selecting and throwing in either the direct, the intermediate or the low speed clutch, and means coöperating with the intermediate and low speed clutch for automatically throwing in the combination jaw and friction clutch in advance of either of said clutches, and a second means adapted to throw out any clutch which may happen to be in engagement.

16. In a transmission mechanism, a drive shaft, a fly wheel secured on said shaft, a series of clutch members carried by the wheel, a driven shaft, a pair of driven sleeve shafts journaled exterior of the driven shafts, a clutch member on each of the sleeve shafts and on the driven shaft, means for normally holding said clutch members out of engagement with the flywheel clutches, and means for selecting and throwing into or out of engagement only one set of clutches at the time.

17. In a transmission mechanism, a drive shaft, a fly wheel secured on said shaft, a series of clutch members carried by the wheel, a driven shaft, a pair of driven sleeve shafts journaled exterior of the driven shafts, a clutch member on each of the sleeve shafts and on the driven shaft, means for normally holding said clutch members out of engagement with the flywheel clutches, means for selecting and throwing into or out of engagement only one set of clutches at the time, and a transmission gearing controlled by each of the sleeve shaft clutches.

18. In a transmission mechanism, a drive shaft, a fly wheel secured on said shaft, a series of clutch members carried by the wheel, a driven shaft, a pair of driven sleeve shafts journaled exterior of the driven shafts, a clutch member on each of the sleeve shafts and on the driven shaft, means for normally holding said clutch members out of engagement with the flywheel clutches, a shifting collar engageable with each of said last named clutch members, a crank arm connected with each shifting collar, a rotating cam member engageable with each crank arm; said cam members being so positioned that only one clutch can move into engagement while the other two will be positively held out, and means for rotating said cams in unison.

19. In a transmission mechanism, a drive shaft, a fly wheel secured on said shaft, a series of clutch members carried by the wheel, a driven shaft, a pair of drive sleeve shafts journaled exterior of the driven shafts, a clutch member on each of the sleeve shafts and on the driven shaft, means for normally holding said clutch members out of engagement with the flywheel clutches, a shifting collar engageable with each of said last named clutch members, a crank arm connected with each shifting collar, a rotating cam member engageable with each crank arm, said cam members being so positioned that only one clutch can move into engagement while the other two will be positively held out, means for rotating said cams in unison, and a transmission gearing controlled by each of the sleeve shaft clutches.

20. In a transmission mechanism, a drive shaft, a fly wheel secured on said shaft, a series of clutch members carried by the wheel, a driven shaft, a pair of drive sleeve shafts journaled exterior of the drive shafts, a clutch member on each of the sleeve shafts and on the driven shaft, means for normally holding said clutch members out of engagement with the flywheel clutches, a shifting collar engageable with each of said last named clutch members, a crank arm connected with each shifting collar, a rotating cam member engageable with each crank arm, said cam members being so positioned that only one clutch can move into engagement while the other two will be positively held out, means for rotating said cams in unison, a transmission gearing controlled by each of the sleeve shaft clutches, and a second means adapted to throw out any clutch which may happen to be in engagement.

21. In a transmission mechanism, a driving shaft, a driven shaft, a counter shaft, means for connecting the driven shaft with the driving shaft and means for locking the countershaft against revolving when power is being transmitted through the driving and driven shaft.

22. In a transmission mechanism, a driving shaft, a driven shaft, a counter shaft, a pair of sleeve shafts journaled exterior of the driven shaft, means for connecting either sleeve shaft or the driven shaft with the drive shaft, means for transmitting power from either sleeve shaft to drive the counter shaft, means for transmitting power from the counter shaft to drive the driven shaft, and means permitting the counter shaft to remain at rest when power is being transmitted direct from the driving to the driven shaft.

23. In a transmission mechanism, a driving shaft, a driven shaft, a counter shaft, a pair of sleeve shafts journaled exterior of the driven shaft, means for connecting either sleeve shaft or the driven shaft with the drive shaft, means for transmitting power from either sleeve shaft to drive the counter shaft, means for transmitting power from the counter shaft to drive the driven shaft, and means for transmitting a twirling movement to the countershaft when power is to be transmitted through either sleeve shaft to drive through the counter shaft and driven shaft, said twirling movement being transmitted to the countershaft just in advance of the time period when either sleeve shaft is connected with the driving shaft.

24. In a transmission mechanism, a drive shaft, a driven shaft, a counter-shaft, means for transmitting power from the drive shaft direct to the driven shaft, means for transmitting power from the drive shaft through the counter-shaft to the driven shaft, and means for transmitting a twirling movement to the counter-shaft before transmitting power therethrough.

25. In a transmission mechanism, a driving shaft, a driven shaft, a counter-shaft, a pair of sleeve shafts journaled exteriorly of the driven shaft, means for connecting either sleeve shaft or the driven shaft with the driving shaft, means for transmitting power from either sleeve shaft to drive the counter-shaft, means for transmitting power from the counter-shaft to drive the driven shaft, and means for transmitting a twirling movement to the counter-shaft when power is to be transmitted through either sleeve shaft to drive through the counter-shaft and driven shaft.

26. In a transmission mechanism, a drive shaft, a counter-shaft, a driven shaft, means for transmitting power direct from the drive shaft to the driven shaft, means for disconnecting the counter-shaft from the drive shaft when power is being transmitted directly through the drive shaft and the driven shaft to permit the counter-shaft to return at rest, and means for transmitting a twirling motion to the countershaft prior to driving therethrough.

27. In a transmission mechanism, a drive shaft, a counter-shaft, a driven shaft, means for transmitting power direct from the drive shaft to the driven shaft, means for transmitting variable speeds from the drive shaft through the counter-shaft to the driven shaft, and means for transmitting a twirling movement to the counter-shaft previous to driving therethrough.

28. In a transmission mechanism, a drive shaft, a countershaft and a driven shaft, means for transmitting variable speeds from the drive shaft to the driven shaft, and means for transmitting a twirling movement to the countershaft previous to driving therethrough.

29. In a transmission mechanism, a drive shaft, a plurality of driven shafts arranged one within the other, a fly-wheel fixed on the drive shaft and having a drum-like rim, a plurality of clutch parts on the inner circumference of the rim, a clutch part on each driven shaft arranged to coöperate with a respective clutch part on the rim, and means for selectively clutching the coöperating clutch parts.

30. In a transmission mechanism, a plurality of variable speed gear sets embodying a friction clutch for each gear set, and means for selecting a friction clutch, for subsequent operation, during the operation of another gear set and its friction clutch.

31. In a transmission mechanism, driving and driven shafts, a clutch connecting the two shafts, and means for disconnecting the clutch including a rock shaft, an arm fixed on the latter, a rotary cam against which the arm bears for being rocked thereby, a pinion connected to the cam for rotating the same, a slidable rack for operating the gear, and means for sliding the rack.

32. In a transmission mechanism, a drive shaft, a fly-wheel thereon having a drum-like rim extending axially to one side, a plurality of sets of friction clutch disks carried on the inner face of the rim, a plurality of driven shafts, each having a radial disk-like member within the flywheel rim which disk-like member has its outer portion offset to form a cylindrical seat, a set of friction clutch disks carried on the cylindrical seat of each disk-like member for coöperating with a respective set on the flywheel, and means for clutching the coöperating sets of disks together.

33. In a transmission mechanism, driving and driven shafts, a clutch directly connecting the two shafts, a second clutch connected to one of the shafts, gearing connecting the other shaft to the second clutch, and means for preliminarily rotating the gearing relative to a disengagement of the first clutch and engagement of the second clutch.

34. In a transmission mechanism, driving and driven shafts, variable speed gear sets embodying a clutch in each gear set, a rock shaft controlling each clutch, an arm fixed on each shaft, a slidable rack bar, pinions meshing therewith, and means controlling the arms and operable by the pinions.

35. In a transmission mechanism, driving and driven shafts, variable speed gear sets embodying a clutch in each gear set, a rock shaft controlling each clutch, an arm fixed on each end of the shafts, a slidable rack bar, pinions meshing therewith, cams fixed to the pinions and provided with notches into which the arms on the adjacent ends of the rock shafts are adapted to engage to render the clutches operative, and means engaging the arms on the opposite ends of the rock shafts to hold the first arms against dropping into the cam notches until the latter are alined therewith.

36. In a transmission mechanism, a drive shaft, a flywheel thereon having a drum-like rim extending axially to one side, a plurality of sets of friction clutch disks carried on the inner face of the rim, a plurality of driven shafts, each having a radial disk-like member within the flywheel rim which disk-like member has its outer portion offset to form a cylindrical seat, a set of friction clutch disks carried on the cylindrical seat of each disk-like member for coöperating with a respective set on the flywheel, a pressure member for each pair of coöperating sets of disks substantially conforming to the respective disk-like member and slidable on each driven shaft for clutching together the sets of disks, and means for sliding the pressure members to selectively operate the clutches.

37. In a transmission mechanism, driving and driven shafts, a plurality of clutch mechanisms adapted to connect the shafts for obtaining different speeds, means for selectively rendering the clutch mechanisms operative, and means for imparting rotary movement to the next low speed clutch mechanism preliminary to shifting from high to said next low speed.

38. In a transmission mechanism, a drive shaft, a flywheel thereon having a drum-like rim extending axially to one side, a plurality of sets of friction clutch disks carried on the inner face of the rim, a plurality of driven shafts, each having a radial disk-like member within the flywheel rim which disk-like member has its outer portion offset to form a cylindrical seat, a set of friction clutch disks carried on the cylindrical seat of each disk-like member for coöperating with a respective set on the flywheel, a pressure member for each pair of coöperating sets of disks substantially conforming to the respective disk-like member and slidable on each driven shaft for clutching together the sets of disks, means for sliding the pressure members to selectively operate the clutches, and spring means connecting each disk-like member to its pressure member for urging the latter to operative position.

39. In a transmission mechanism, a drive shaft, a plurality of driven shafts, means for selectively clutching the driven shafts to the drive shaft, a counter shaft geared to one driven shaft, a gear slidable on the other driven shaft and meshing with a gear on the countershaft, means for clutching the slidable gear to its supporting driven shaft, and means for twirling the slidable gear and the counter shaft before clutching said slidable gear to its shaft.

In testimony whereof I have hereunto set my hand in the presence of two subscribing witnesses.

JOHN J. CAMPODONICO.

Witnesses:
JOHN H. HERRING,
EDWARD T. LEVERONI.

Copies of this patent may be obtained for five cents each, by addressing the "Commissioner of Patents, Washington, D. C."